(12) United States Patent
Leroux et al.

(10) Patent No.: US 6,717,909 B2
(45) Date of Patent: Apr. 6, 2004

(54) ETHERNET PROTECTION SYSTEM PROVIDING FAULT TOLERENCE FOR COMMUNICATION LINES AND INTERFACE CARDS ACCORDING TO CLASSIFIED FAILURE STATES

(75) Inventors: Andre Leroux, Montreal (CA); Massimiliano Tornar, Flower Mound, TX (US)

(73) Assignee: Marconi Communications, Inc., Cleveland, OH (US)

( * ) Notice: Subject to any disclaimer, the term of this patent is extended or adjusted under 35 U.S.C. 154(b) by 0 days.

(21) Appl. No.: 10/163,828

(22) Filed: Jun. 5, 2002

(65) Prior Publication Data

US 2003/0012135 A1 Jan. 16, 2003

Related U.S. Application Data (60) Provisional application No. 60/296,058, filed on Jun. 5, 2001.

(51) Int. Cl.[7] ............................................... G01R 31/08
(52) U.S. Cl. ...................... 370/228; 370/227; 370/216; 370/217; 370/221; 370/225; 714/2; 714/4; 709/227; 709/238; 709/239; 709/240
(58) Field of Search ................................. 709/227, 238, 709/239, 240; 714/2, 4; 370/216, 217, 218, 221, 222, 225, 227, 228

(56) References Cited

U.S. PATENT DOCUMENTS

| 5,648,956 | A | | 7/1997 | Sambamurthy et al. |
| 5,787,085 | A | * | 7/1998 | Fox ............................. 370/392 |
| 5,991,312 | A | * | 11/1999 | Koenig et al. .............. 370/535 |
| 6,137,775 | A | * | 10/2000 | Bartlett et al. .............. 370/216 |
| 6,160,806 | A | * | 12/2000 | Cantwell et al. ............ 370/360 |
| 6,181,929 | B1 | * | 1/2001 | Korinek et al. ............. 455/423 |
| 6,279,158 | B1 | * | 8/2001 | Geile et al. ................. 725/126 |
| 6,282,169 | B1 | * | 8/2001 | Kiremidjian ................ 370/220 |
| 6,308,282 | B1 | * | 10/2001 | Huang et al. .................. 714/4 |
| 6,366,558 | B1 | * | 4/2002 | Howes et al. ............... 370/219 |
| 6,377,992 | B1 | * | 4/2002 | Plaza Fernandez et al. . 709/227 |
| 6,457,055 | B1 | * | 9/2002 | Hwong et al. .............. 709/227 |
| 2002/0080575 | A1 | | 6/2002 | Nam et al. |

* cited by examiner

Primary Examiner—Nabil El-Hady
(74) Attorney, Agent, or Firm—Jones Day (57) ABSTRACT

An Ethernet protection system includes an Ethernet communication device operable to be connected to first and second Ethernet lines forming a parallel connection. The Ethernet communication device is able to select the first Ethernet line and transmit and receive data over the first Ethernet line, and upon detecting a failure in the first Ethernet line, automatically select the second Ethernet line and transmit and receive data over the second Ethernet line.

17 Claims, 4 Drawing Sheets

ETHERNET PROTECTION SYSTEM PROVIDING FAULT TOLERENCE FOR COMMUNICATION LINES AND INTERFACE CARDS ACCORDING TO CLASSIFIED FAILURE STATES

This application claims benefit of U.S. Provisional Application Ser. No. 60/296,058, entitled "Self Protected Dual Ethernet Connection" which was filed on Jun. 5, 2001, the entire disclosure of which is incorporated herein by reference.

BACKGROUND

1. Field of the Invention

The present invention is related to the field of data communications. More specifically, the invention relates to protecting a network connection between two Ethernet devices in the network. Such connections may include, for example, a connection between a SONET network element and an Ethernet switch.

2. Description of the Related Art

Several techniques exist for protecting network connections, such as in a Local Area Network (LAN) or a Wide Area Network (WAN). Two popular protection schemes are the spanning tree protocol, which is documented in the IEEE 802.1D standard, and trunking, which is documented in the IEEE 802.3ad standard.

The spanning tree algorithm allows Ethernet devices, such as bridges and switches, in an Ethernet network to dynamically create a loop-free set of paths. Loops in an Ethernet network may result in forwarding loops, in which broadcast and multicast traffic circulates endlessly and continues to grow as new broadcast and multicast traffic is transmitted. Eventually the traffic rate gets so high that the Ethernet network is saturated. The spanning tree protocol provides network protection at the LAN level by building a complex hierarchical management structure between all Ethernet devices in the network. A special management protocol is regularly broadcast between each Ethernet device to monitor the network topology and to detect fault conditions. If one leg or section of the path is interrupted or fails, the spanning tree algorithm allows the Ethernet network to dynamically build another loop-free set of paths. However, depending on the complexity of the Ethernet network, the spanning tree algorithm may be complex to implement, and a significant amount of time may be required for network reconfiguration in the event of a failure on one of the paths.

The trunking protocol provides a means to aggregate multiple links between two Ethernet devices. While normally a loop condition occurs when parallel connections are established between Ethernet devices, trunking eliminates this loop condition by treating the parallel connections as an aggregation group or a single link. Traffic is load shared across the parallel links, and thus trunking makes for a fault tolerant connection. When one or multiple links fail, the aggregation group will converge to a new configuration. However, the bandwidth provided by the failed links is lost. Furthermore, there is no direct expansion of the standard to work with optical transport equipment, such as SONET/SDH equipment. Finally, all links in the aggregate group need to be configured in duplex mode and have the same bandwidth.

SUMMARY

An Ethernet protection system comprises an Ethernet communication device operable to be connected to first and second Ethernet lines forming a parallel connection. The Ethernet communication device is able to select the first Ethernet line and transmit and receive data over the first Ethernet line, and upon detecting a failure in the first Ethernet line, automatically select the second Ethernet line and transmit and receive data over the second Ethernet line.

An Ethernet protection system for protecting an Ethernet connection defined by first and second Ethernet lines forming a parallel connection comprises a first Ethernet mapper card, a second Ethernet mapper card, and a switching device. The first Ethernet mapper card is operable to be connected to the first Ethernet line, and the second Ethernet mapper card is operable to be connected to the second Ethernet line. The switching device is connected to the first and second Ethernet mapper cards and a communication line, and is operable to switch a connection to the communication line between the first and second Ethernet mapper cards.

DETAILED DESCRIPTION

Figure 1:
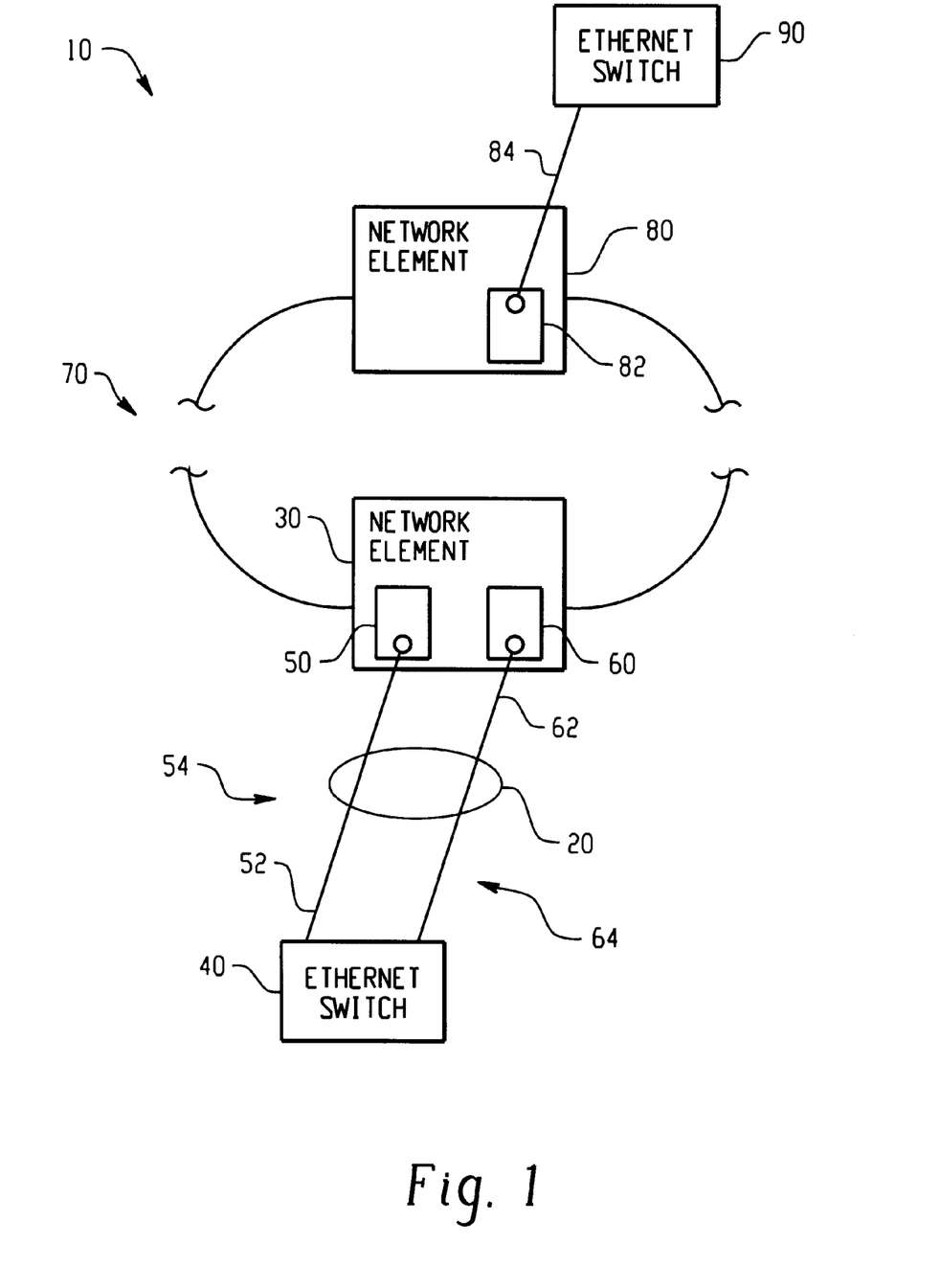
FIG. 1 is a block diagram of an Ethernet protection system protecting an Ethernet connection between two Ethernet devices.

The Ethernet protection system protects an Ethernet line connecting two Ethernet devices against a line failure or failure of an Ethernet card connected to the line. FIG. 1 provides a block diagram of an Ethernet protection system 10 protecting an Ethernet connection 20 between two Ethernet devices 30 and 40. The first Ethernet device 30 may be a SONET network element capable of Add-Drop Multiplexing (ADM), Digital Cross Connection (DCC), or both, and the second Ethernet device 40 may be an Ethernet switch. The network element 30 includes a pair of Ethernet mapper cards 50 and 60, and each Ethernet mapper card 50 and 60 is connected to an Ethernet line 52 and 62, respectively. The Ethernet lines 52 and 62 form a parallel connection between the network element 30 and the switch 40. The network element 30 transmits and receives data over a SONET/SDH network 70. The SONET/SDH network 70 comprises other SONET/SDH devices and Ethernet devices, such as another network element 80, which also includes an Ethernet mapper card 82 that communicates with another Ethernet switch 90 via an Ethernet line 84.

The SONET/SDH network 70 uses an STS-N frame format to transmit and receive data. The STS-N frame can be divided into two main areas: the transport overhead (TOH) and the synchronous payload envelop (SPE). The SPE can further be divided into the STS path overhead and the payload. The payload contains the data a user desires to transmit and receive over the SONET/SDH network 70. Because the SONET/SDH network 70 is a synchronous network, data is multiplexed into the SPE for transmission. The data can then be transported and switched through the SONET/SDH network 70 without having to be examined or demultiplexed at intermediate nodes.

The network element 30 multiplexes and demultiplexes data transmitted over the SONET/SDH network 70. An exemplary device providing network element functionality is the MCN-7000 Advance Multiple Services Carrier Node from Marconi Communications.

The Ethernet mapper cards 50 and 60 map Ethernet frame data into the SPE data and also receive Ethernet frame data from the SPE data. Thus, the network element 30 and the Ethernet mapper cards 50 and 60 allow users to transport Ethernet traffic across the SONET/SDH network 70. Exemplary Ethernet mapper cards 50 and 60 are the FastE Mapper Ethernet cards from Marconi Communications.

By transporting Ethernet traffic across the SONET/SDH network 70, Ethernet data may be exchanged between the Ethernet switches 40 and 90. Instead of a single Ethernet line between the network element 30 and switch 40, however, the Ethernet lines 52 and 62 form a parallel Ethernet connection 20 between the network element 30 and the switch 40. These Ethernet lines 52 and 62 are illustratively a pair of 100 BaseT lines. The first line 52 is designated a working line, and the second line 62 is designated a protection line.

Likewise, the first Ethernet mapper card 50 is designated the working Ethernet mapper card, and the second Ethernet mapper card 60 is designated the protection Ethernet mapper card. The combination of the working Ethernet mapper card 50 and the working line 52 is a working channel 54, and the combination of the protection Ethernet mapper card 60 and the protection line 62 is a protection channel 64. During normal operation in which the working channel 54 is active, the working channel 54 is used to transmit and receive Ethernet traffic, and the protection channel 64 is not used to transmit and receive Ethernet traffic. Thus, a forwarding loop is not formed, and the Ethernet switch 40 also does not require to be specially configured to accommodate the Ethernet protection system 10.

The protection channel 64 is not used until a failure is detected in the working channel 54. Should a failure occur in the working line 52, or in the working Ethernet mapper card 50, traffic from the network element 30 to the Ethernet switch 40 is switched from the working channel 54 to the protection channel 64. When the Ethernet switch 40 receives traffic from the protection line 62, the Ethernet switch 40 will automatically reconfigure to use the protection line 62 instead of the working line 52. Traffic disruption time is proportional to the protection switching time in the network element 30.

The Ethernet protection system 10 may also be configured to be revertive, in which traffic is switched back to the working channel 54 once the working channel 54 is restored.

Figure 2:
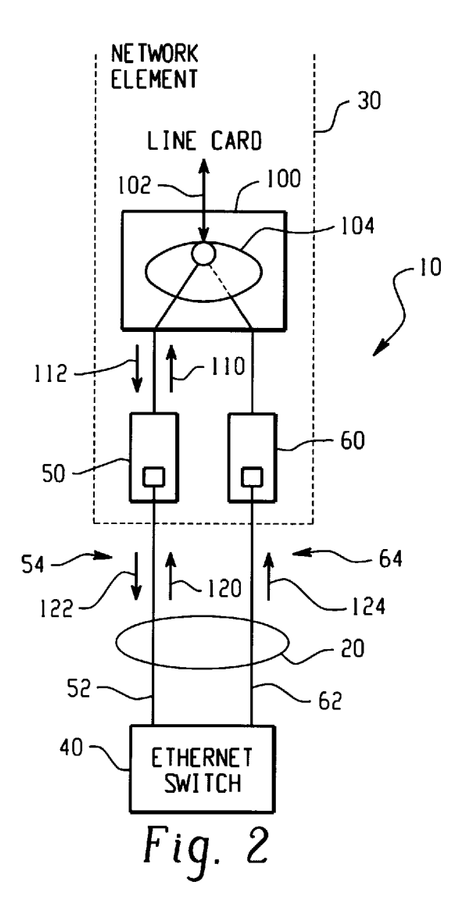
FIGS. 2 and 3 are more detailed block diagrams of the Ethernet protection system.
Figure 3:
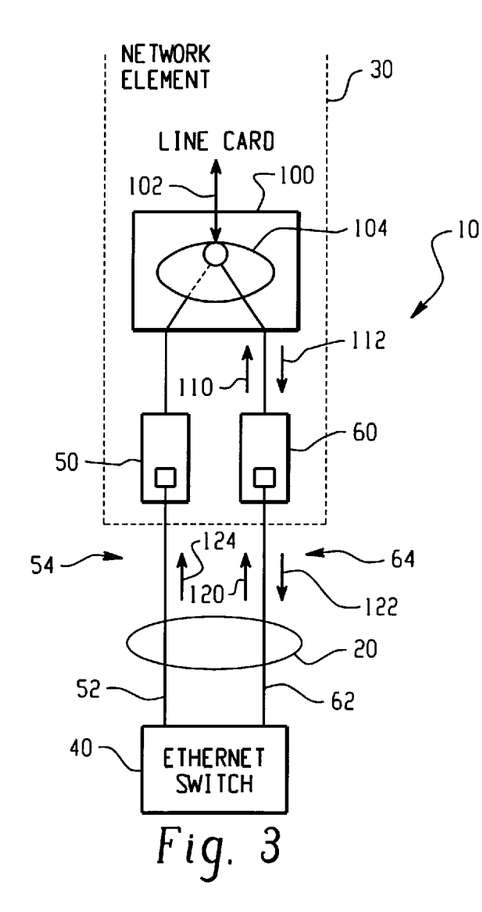

FIGS. 2 and 3 provide more detailed block diagrams of the Ethernet protection system 10. In FIG. 2, the Ethernet mapper cards 50 and 60 are connected to a cross connect switch 100. An exemplary cross connect switch 100 is a digital cross connect device. The cross connect switch 100 is also connected to a communication line 102 over which STS-N data frames are transmitted to and received from line cards in the network element 30. The cross connect switch 100 also comprises switching circuitry 104 that is operable to switch the connection to the communication line 102 between the working and protection Ethernet mapper cards 50 and 60.

The Ethernet mapper cards 50 and 60 are operable to map Ethernet traffic in the upstream direction (indicated by arrow 110) into SONET payload envelopes. The cross connect switch 100 switches the SONET payloads to line cards operable to transmit data over optical fiber channels. In the downstream direction (indicated by arrow 112), traffic from the line card is sent form the cross connect switch 100 only to the Ethernet mapper connected to the communication line 102. As depicted in FIG. 2, the switching circuitry 104 has selected the working Ethernet mapper card 50 and deselected the protection Ethernet mapper card 60. Thus, Ethernet traffic is sent from the working Ethernet mapper card 50 to the switch 40, as indicated by arrow 122, and traffic is sent from the Ethernet switch 40 to the working Ethernet mapper card 50, as indicated by arrow 120. The protection Ethernet mapper card 60 does not transmit Ethernet traffic, and receives only the Ethernet broadcast traffic, as indicated by arrow 124.

During normal operation, the working Ethernet mapper card 50 transmits line quality data to the cross connect switch 100. The line quality data indicates the status of the working channel 54. The line quality data value may indicate an OK status, in which case the Ethernet mapper card 50 is functioning normally and data is being transmitted and received over the working line 52. The line quality data value may, on the other hand, indicate a FAIL status, indicating either a failure in the working Ethernet mapper card 50 or a failure in the working line 52.

The line quality data may be transmitted in the TOH portion of the STS-N frame. In the exemplary embodiment of FIGS. 1–3, the line quality data is transmitted in a Line Switch Configuration/Line Quality Tag (LSC/LQT) 16-bit data field. The LSC is stored in the most significant byte of the data field and the LSB is stored in the least significant byte. The LQT is inserted by the low level on the Ethernet mapper card 50. The TOH is read by the low level on the cross connect switch 100.

The cross connect switch 100 is responsible for operation of switching between the working Ethernet mapper card 50 and the protection Ethernet mapper card 60. When the cross connect switch 100 receives line quality data indicating that the working Ethernet mapper card 50 or the working line 52 has failed, the cross connect switch 100 switches the connection to the communication line 102 to the protection Ethernet mapper card 60. Thus, the protection Ethernet mapper card 60 is selected and the working Ethernet mapper card 50 is deselected. The cross connect switch 100 then activates the protection Ethernet mapper card 60.

The Ethernet mapper cards 50 and 60 preferably have the same configuration. However, the Ethernet protection system 10 may be configured to automatically configure the protection Ethernet mapper card 60 to the same configuration as the working Ethernet mapper card 50 upon switching the connection to the communication line 102 from the working Ethernet mapper card 50 to the protection Ethernet mapper card 60.

FIG. 3 provides a block diagram of the Ethernet protection system 10 after switching from the working Ethernet mapper card 50 to the protection Ethernet mapper card 60. Ethernet traffic is sent from the protection Ethernet mapper card 60 to the switch 40, as indicated by arrow 122. When the Ethernet switch 40 receives traffic from the protection line 62, the Ethernet switch 40 will automatically reconfigure its MAC to Ethernet-port table to use the protection line 62 instead of the working line 52. The Ethernet switch 40 then sends traffic to the protection Ethernet mapper card 60, as indicated by arrow 120.

Figure 4:
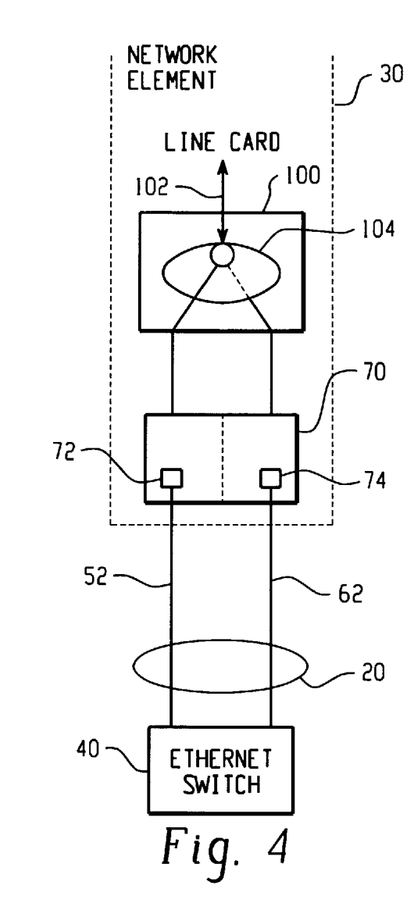
FIG. 4 is a block diagram of another embodiment of the Ethernet protection system.

FIG. 4 provides a block diagram of another embodiment of the Ethernet protection system 10. In this embodiment, the Ethernet protection system 10 is implemented on a single Ethernet mapper card 70 having two available ports 72 and 74, the first port 72 connected to the working line 52 and the second port 74 connected to the protection line 62. The cross connect switch 100 switches between the working line 52 and the protection line 62 by selecting the corresponding ports 72 and 74 of the Ethernet mapper card 70. While this embodiment will provide a protection channel 64 for the working channel 54 using only one Ethernet mapper card 70, it will also introduce the possibility of a single point failure in the Ethernet mapper card 70 that may, in turn, prevent Ethernet traffic from being transmitted over both the working and protection lines 52 and 62.

Switching between the Ethernet mapper cards 50 and 60 may be configured to be revertive or non-revertive. When switching is configured as revertive, the cross connect switch 100 switches the connection to the communication line 102 back to the Ethernet mapper card 50 when the line quality data value indicates a recovery in the working channel 54 from the failure condition. When switching is configured as non-revertive, the cross connect switch 100 will not switch the connection to the communication line 102 back to the working Ethernet mapper card 50.

Figure 5:
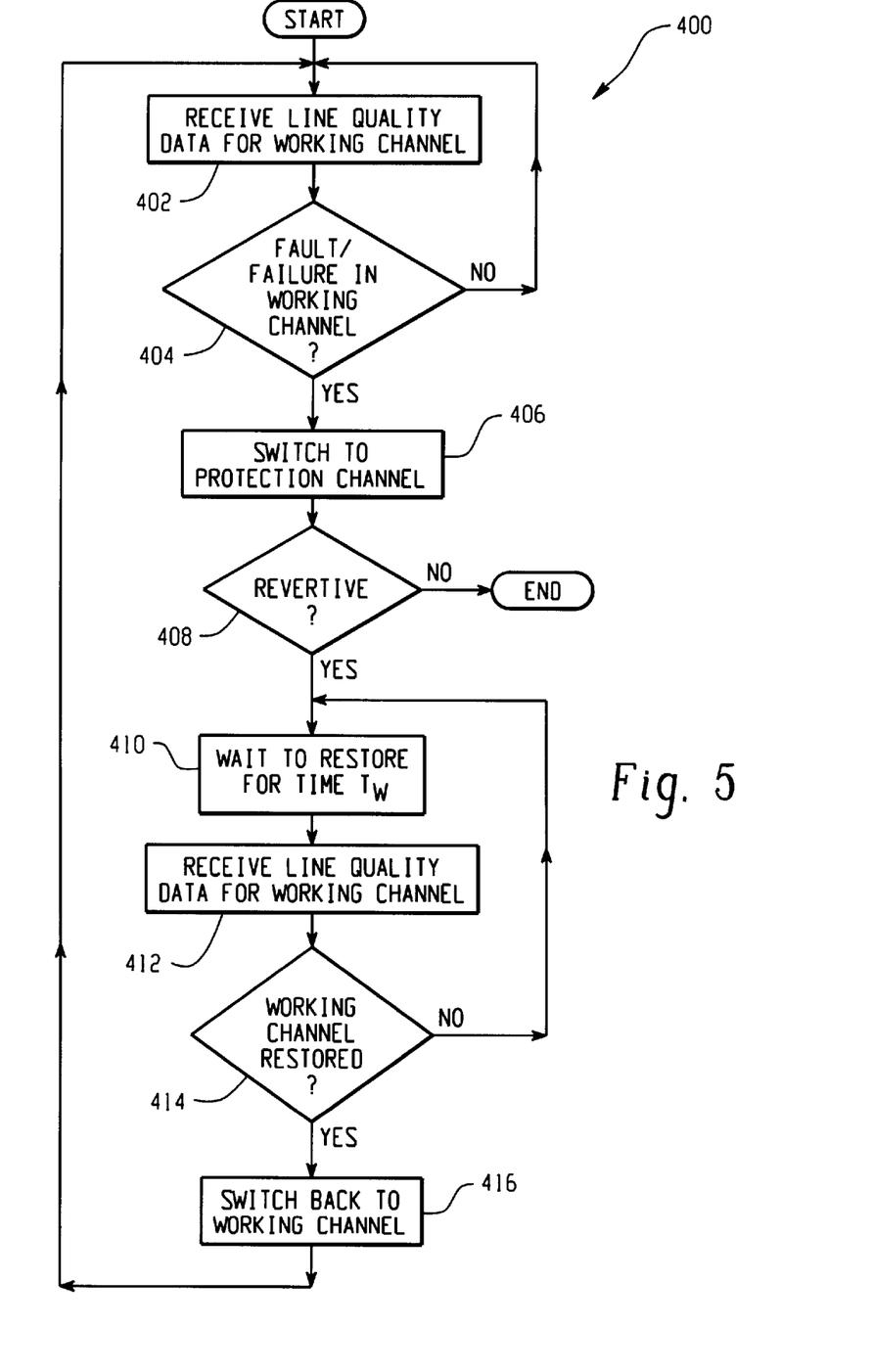
FIG. 5 is a flow diagram illustrating line detection failure and switching.

FIG. 5 provides a flow diagram 400 illustrating dual Ethernet line protection switching that may be configured to be revertive or non-revertive. In step 402, the cross connect switch 100 receives line quality data for the working channel 54. In step 404, the cross connect switch 100 determines whether the line quality data indicates a fault or failure error state in the working channel 54. If there is no fault or failure error state in the working channel 54, the cross connect switch 100 maintains the connection between the communication line 102 and the working Ethernet mapper card 50.

However, if the line quality data indicates a fault or failure in the working channel 54, the cross connect switch 100 switches the connection to the communication line 102 to the protection Ethernet mapper card 60, as shown in step 406. The protection Ethernet mapper card 60 then transmits traffic over the protection channel 64.

In step 408 the cross connect switch 100 determines whether a revertive option has been set. If a revertive option has not been set, line protection processing ends.

If, on the other hand, a revertive option has been set, the cross connect switch 100 enters a "wait to restore" mode and waits for a time $T_W$, as shown in step 410. After the wait time $T_W$ has expired, the cross connect switch 100 checks the line quality data for the working channel 54, as shown in step 412. In step 414, the cross connect switch 100 determines if the working channel 54 has recovered. If the working channel 54 has not recovered, steps 410, 412 and 414 are repeated. However, if the working channel 54 has recovered, the cross connect switch 100 switches back to the working channel 54, as shown in step 416. Step 402 is then repeated.

In an alternative embodiment, the Ethernet protection system 10 in the revertive mode enters a wait to restore mode after the recovery of the working channel 54. After the working channel 54 has recovered, the cross connect switch 100 waits for a time $T_W$, before switching the connection to the communication line 102 from the protection Ethernet mapper card 60 back to the working Ethernet mapper card 50.

In the embodiments described above, a default wait to restore time is 5 minutes. The wait to restore time may be adjusted to be more or less than 5 minutes.

Failures in the working channel 54 may also be classified according to failure types, and the Ethernet protection system 10 may be configured to be revertive or non-revertive depending on the failure type indicated by the line quality data. For example, failures may be classified as line failures and card failures, and the Ethernet protection system 10 may be configured to be revertive for a line failure, and non-revertive for a card failure. An exemplary card failure is a power failure, which may be caused by a fault in the Ethernet mapper card 50, by removal of the Ethernet mapper card 50 from the network element 30, or by other events causing loss of power or loss of the Ethernet mapper card 50 processing. An exemplary line failure is an Ethernet UNLINK condition.

Figure 6:
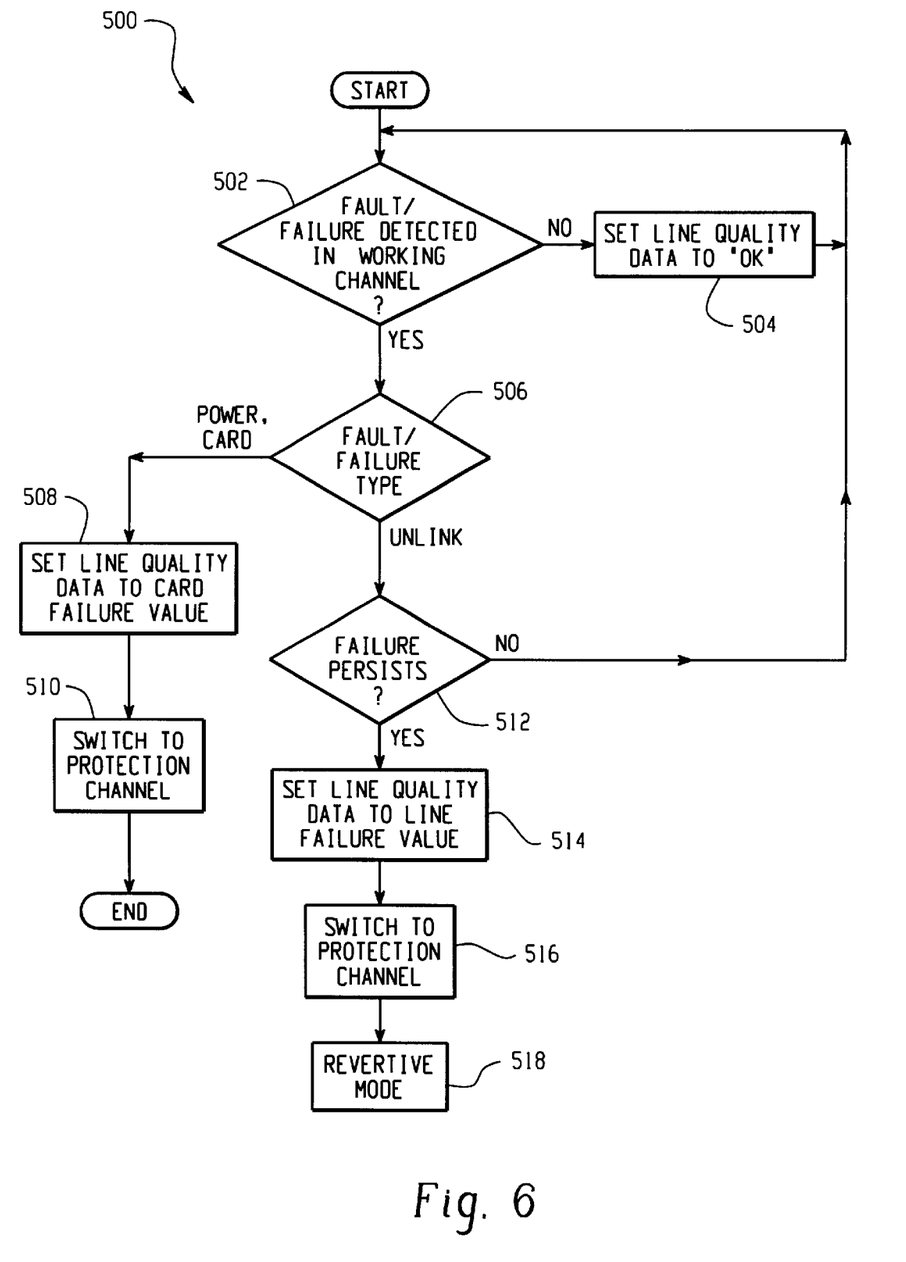
FIG. 6 is a flow diagram illustrating the activation of revertive and non-revertive modes based on line quality data.

FIG. 6 provides a flow diagram 500 illustrating the activation of revertive and non-revertive modes based on exemplary failure types. In step 502, the working Ethernet mapper card 50 determines whether a fault or failure has been detected in the working channel 54. If no fault or failure has been detected, then in step 504 the line quality data is set to the status "OK."

However, if a fault or failure has been detected in the working channel 54, the working Ethernet mapper card 50 determines the fault or failure type. If the fault or failure type is a card failure, the line quality data is set to a card failure value, as shown in step 508. The cross connect switch 100 then switches traffic to the protection channel 64, as shown in step 510, and the switching process then ends.

However, if the fault or failure type is a line failure, such as an Ethernet UNLINK condition, the mapper card determines whether the failure persists for a specified period of time, as shown in step 512. In the event of a loss of signal (LOS) at the working Ethernet mapper card 50, an UNLINK condition is set. If the UNLINK condition persists for a specified time period, the line quality data may be changed from an "OK" status to an "LOS" status. The user may select the duration of the time period. In the embodiment of FIGS. 1–3, the time period is defaulted to 200 milliseconds, and may be adjusted from 100 milliseconds to 1 second.

If the failure does not persist, the line quality data is set to the status "OK." If the failure does persist, however, the line quality data is set to a line failure value, as shown in step 514. The Ethernet protection system 10 then switches traffic to the protection channel 64, as shown in step 516, and enters a revertive mode in step 518. The revertive mode is as described with respect to steps 410–416 above.

Switching between the working and protection Ethernet mapper cards 50 and 60 may also be implemented manually, such as by a user command from a management interface. For example, if the working Ethernet mapper card 50 is to be temporarily removed or replaced, a user may enter a command that causes the cross connect switch 100 to switch the connection to the communication line 102 from the working Ethernet mapper card 50 to the protection Ethernet mapper card 60. Exemplary user commands include Forced Switch To Worker, Forced Switch To Protection, Manual Switch To Worker, Manual Switch To Protection, Clear, and Lock Out Of Protection. Other user commands may also be defined and implemented. The user commands and error states may also be prioritized to override other user commands or override the Ethernet protection system 10 switching conditions resulting from the error states.

The Forced Switch to Worker command causes the cross connect switch 100 to switch to or maintain a connection from the communication line 102 to the working channel 54. This command is prioritized higher than error states in the line quality data and thus traffic remains on the working channel 54 regardless of the error state indicated by the line quality data.

The Forced Switch to Protection command causes the cross connect switch 100 to switch to or maintain a connection from the communication line 102 to the protection channel 64. This command is prioritized higher than error states in the line quality data and thus traffic remains on the protection channel 64 regardless of the error state indicated by the line quality data.

The Manual Switch To Worker command causes the cross connect switch 100 to switch to or maintain a connection from the communication line 102 to the working channel 54 unless a higher priority state occurs. This command is prioritized lower than error states in the line quality data and thus the cross connect switch 100 responds to error states even if this command has been issued.

The Manual Switch To Protection command causes the cross connect switch 100 to switch to or maintain a connection from the communication line 102 to the protection channel 64 unless a higher priority state occurs. This command is prioritized lower than error states in the line quality data and thus the cross connect switch 100 responds to error states even if this command has been issued.

The Clear command clears any of the Forced Switch To Worker, Forced Switch To Protection, Manual Switch To Worker, and Manual Switch To Protection commands entered.

The Lock Out Protection Command locks out switching to the protection channel 64. This is the highest priority command and the Ethernet protection system 10 will not switch the communication line 102 from the working channel 54 when this command has been issued.

An exemplary priority scheme for the above-identified commands and error states is provided in Table 1 below. The commands and states are prioritized from 1–10, with 1 being the highest priority and 10 being the lowest priority. The indication field specifies the command or error state. The selected channel field specifies the channel selected when the command or error state is received.

TABLE 1

Command/Error Priority Scheme

| PRIORITY | INDICATION | SELECTED CHANNEL |
|---|---|---|
| 1 | LOCKOUT OF PROTECTION | WORKING |
| 2 | FORCED SWITCH TO PROTECTION | WORKING |
| 3 | FORCED SWITCH TO WORKING | PROTECTION |
| 4 | SIGNAL FAIL WORKING | WORKING |
| 5 | SIGNAL DEGRADE WORKING | WORKING |
| 6 | MANUAL SWITCH TO PROTECTION | WORKING |
| 7 | MANUAL SWITCH TO WORKING | PROTECTION |
| 8 | WAIT TO RESTORE | PROTECTION |
| 9 | DO NOT REVERT | PROTECTION |
| 10 | NO REQUEST (E.G., WORKING OK AND IN REVERTIVE MODE; WORKING OK; PROTECTION IN NON-REVERTIVE MODE) | PROTECTION OR WORKING |

According to Table 1, if the Lockout of Protection command has been issued, which is the highest priority command, and a signal failure is detected in the working channel 54, which is a lower prioity state, the Ethernet protection system 10 will not switch to the protection channel 54. Conversely, if a Manual Switch to Working command has been issued, and a signal failure is detected in the working channel 54, which is a higher priority state, the Manual Switch to Working command will be ignored.

The priority scheme, commands and error states of Table 1 are exemplary; other priority schemes, commands and error states may be implemented.

The embodiments described herein are examples of structures, systems or methods having elements corresponding to the elements of the invention recited in the claims. This written description may enable those of ordinary skill in the art to make and use embodiments having alternative elements that likewise correspond to the elements of the invention received in the claims. The intended scope of the invention thus includes other structures, systems or methods that do not differ from the literal language of the claims, and further includes other structures, systems or methods with insubstantial differences from the literal language of the claims.

What is claimed is:

1. An Ethernet protection system, comprising: a first Ethernet communication device operable to be connected to first and second Ethernet lines forming a parallel connection and select the first Ethernet line and transmit and receive data over the first Ethernet line, and upon detecting a failure in the first Ethernet line, automatically select the second Ethernet line and transmit and receive data over the second Ethernet line, wherein the first Ethernet communication device comprises:

a first Ethernet card module operable to be connected to the first Ethernet line;

a second Ethernet card module operable to be connected to the second ethernet line; and a switching device connected to the first and second Ethernet card modules and a communication line, the switching device operable to switch a connection to the communication line between the first and second Ethernet card modules, to detect a failure state from the first Ethernet card module and switch the connection to the communication line from the first Ethernet card module to the second Ethernet card module upon the detection of the failure state, wherein the failure sttates are classified according to first and second failure classes, and the switching device is operable to enter a revertive mode upon detecting a failure state in the first class, and enter a non-revertive mode upon detecting a failure state in the second class.

2. The system of claim 1, wherein the switching device in the revertive mode is operable to detect a recovery state from the first Ethernet card module and switch the connection to the communication line from the second Ethernet card module back to the first Ethernet card module.

3. The system of claim 2, further comprising a second Ethernet communication device operable to be connected to the first and second Ethernet lines and automatically configure to transmit and receive data over the Ethernet line selected by the first Ethernet communication device.

4. The system of claim 2, wherein the first and second Ethernet card modules are first and second Ethernet mapper cards, respectively.

5. The system of claim 4, wherein the Ethernet mapper cards are operable to transmit line quality data to the switching device, the line quality data indicating the failure state or the recovery state.

6. The system of claim 5, wherein the switching device is a digital cross connect switch.

7. The system of claim 6, wherein the first Ethernet communication device is a Multiple Services Carrier Node.

8. The system of claim 1, wherein the switching device is further operable to receive user commands and switch the connection to the communication line between the first and second Ethernet card modules based on the user commands.

9. The system of claim 8, wherein the user commands, failure states and recovery states are prioritized according to a priority scheme, and the switching device is operable to switch the connection to the communication line between the first and second Ethernet card modules based on the priority scheme.

10. The system of claim 1, wherein the failure states of the first class include line failures, and failure states of the second class include card failures.

11. An Ethernet protection system for protecting an Ethernet connection defined by first and second Ethernet lines forming a parallel connection, comprising:

a first Ethernet mapper card operable to be connected to the first Ethernet line;

a second Ethernet mapper card operable to be connected to the second Ethernet line; and a switching device connected to the first and second Ethernet mapper cards and a communication line, the switching device operable to switch a connection to the communication line between the first and second Ethernet mapper cards, to detect a failure state from the first Ethernet mapper card and switch a connection to the communication line from the first Ethernet mapper card to the second Ethernet mapper card upon the detection of the failure state, and wherein the failure states are classified according to first and second failure classes, and the switching device is further operable to enter a revertive mode upon detecting a failure state in the first class, and enter a non-revertive mode upon detecting a failure state in the second class.

12. The system of claim 11, wherein the switching device in the revertive mode is operable to detect a recovery state from the first Ethernet mapper card and switch the connection to the communication line from the second Ethernet mapper card back to the first Ethernet mapper card.

13. The system of claim 12, wherein the Ethernet mapper cards are operable to transmit line quality data to the switching device, the line quality data indicating the failure state or the recovery state.

14. The system of claim 13, wherein the switching device is a digital cross connect switch.

15. The system of claim 14, wherein the switching device is further operable to receive user commands and switch the connection to the communication line between the first and second Ethernet mapper cards based on the user commands.

16. The system of claim 15, wherein the user commands, failure states and recovery states are prioritized according to a priority scheme, and the switching device is operable to switch the connection to the communication line between the first and second Ethernet mapper cards based on the priority scheme.

17. The system of claim 16, wherein failure states of the first class include Ethernet line failures, and failure states of the second class include Ethernet mapper card failures.

* * * * *

UNITED STATES PATENT AND TRADEMARK OFFICE
CERTIFICATE OF CORRECTION

PATENT NO.     : 6,717,909 B2
DATED          : April 6, 2004
INVENTOR(S)    : Leroux et al.

It is certified that error appears in the above-identified patent and that said Letters Patent is hereby corrected as shown below:

Column 8,
Line 36, "sttates" should be -- states --

Signed and Sealed this

Sixth Day of July, 2004

JON W. DUDAS
*Acting Director of the United States Patent and Trademark Office*